(12) United States Patent
Ifrah et al.

(10) Patent No.: US 8,956,994 B2
(45) Date of Patent: Feb. 17, 2015

(54) COMPOSITION CONTAINING OXIDES OF ZIRCONIUM, CERIUM AND AT LEAST ONE OTHER RARE EARTH AND HAVING A SPECIFIC POROSITY, METHOD FOR PREPARING SAME AND USE THEREOF IN CATALYSIS

(75) Inventors: Simon Ifrah, La Jarre (FR); Olivier Larcher, Perigny (FR)

(73) Assignee: Rhodia Operations, Paris (FR)

( * ) Notice: Subject to any disclaimer, the term of this patent is extended or adjusted under 35 U.S.C. 154(b) by 192 days.

(21) Appl. No.: 13/696,548

(22) PCT Filed: May 2, 2011

(86) PCT No.: PCT/EP2011/056907
§ 371 (c)(1),
(2), (4) Date: Jan. 15, 2013

(87) PCT Pub. No.: WO2011/138255
PCT Pub. Date: Nov. 10, 2011

(65) Prior Publication Data
US 2013/0142713 A1 Jun. 6, 2013

(30) Foreign Application Priority Data
May 6, 2010 (FR) ..................... 10 01947

(51) Int. Cl.
*B01J 21/00* (2006.01)
*B01J 23/00* (2006.01)
(Continued)

(52) U.S. Cl.
CPC ............. *B01J 23/10* (2013.01); *B01D 53/9413* (2013.01); *B01J 23/002* (2013.01); *B01J 23/63* (2013.01); *B01J 35/1014* (2013.01); *B01J 35/1047* (2013.01); *B01J 35/109* (2013.01);
(Continued)

(58) Field of Classification Search
USPC .................................. 502/100, 300, 302, 304
See application file for complete search history.

(56) References Cited

U.S. PATENT DOCUMENTS 4,657,644 A * 4/1987 Bachot et al. ................. 205/493
7,700,059 B2 * 4/2010 Myeong et al. ............... 423/263
(Continued)

FOREIGN PATENT DOCUMENTS

FR 2570087 A1 3/1986
WO 98/45212 A1 10/1998

OTHER PUBLICATIONS

Feng et al., "Hydrothermal synthesis of stable mesoporous ZrO2—Y2O3 and CeO2—ZrO2—Y2O3 from simple inorganic salts and CTAB template in aqueous medium," Materials Chemistry and Physics, 2008, pp. 132-136, vol. 107.
(Continued)

*Primary Examiner* — James McDonough

(57) ABSTRACT

A composition is described that includes zirconium oxide, cerium oxide and yttrium oxide, or zirconium oxide, cerium oxide and at least two oxides of two rare earths different from cerium in a mass proportion of at least 20% of zirconium oxide and of at most 70% of cerium oxide, wherein the composition further includes, after calcination at 900° C. for 4 hours, two populations of pores having respective diameters centered, for the first population, about a value of 20 nm to 40 nm and, for the second, about a value of 80 nm to 200 nm. The composition can be used for processing exhaust gases of internal combustion engines.

22 Claims, 1 Drawing Sheet

(51) Int. Cl.
| | |
|---|---|
| *B01J 25/00* | (2006.01) |
| *B01J 29/00* | (2006.01) |
| *B01J 23/10* | (2006.01) |
| *B01D 53/94* | (2006.01) |
| *B01J 23/63* | (2006.01) |
| *B01J 35/10* | (2006.01) |
| *B01J 37/00* | (2006.01) |
| *B01J 37/03* | (2006.01) |
| *B01J 37/10* | (2006.01) |
| *C01G 25/00* | (2006.01) |
| *C01G 25/02* | (2006.01) |

(52) U.S. Cl.
CPC ............ *B01J37/0018* (2013.01); *B01J 37/031* (2013.01); *B01J 37/10* (2013.01); *C01G 25/00* (2013.01); *C01G 25/006* (2013.01); *C01G 25/02* (2013.01); *B01D 53/94* (2013.01); *B01D 2255/1021* (2013.01); *B01D 2255/1023* (2013.01); *B01D 2255/1025* (2013.01); *B01D 2255/1028* (2013.01); *B01D 2255/2061* (2013.01); *B01D 2255/2063* (2013.01); *B01D 2255/2065* (2013.01); *B01D 2255/2068* (2013.01); *B01D 2255/20715* (2013.01); *B01D 2255/407* (2013.01); *B01D 2255/9205* (2013.01); *B01D 2255/9207* (2013.01); *B01J 2523/00* (2013.01); *C01P 2006/14* (2013.01); *C01P 2006/17* (2013.01)
USPC ............ 502/304; 502/100; 502/300; 502/302

(56) References Cited

U.S. PATENT DOCUMENTS 7,722,829 B2 * 5/2010 Punke et al. ................... 422/180
2010/0233053 A1 * 9/2010 Lewis et al. ................ 423/239.1
2011/0152064 A1 * 6/2011 Keshavan et al. ............... 502/62

OTHER PUBLICATIONS

He et al., "Defective structure, oxygen mobility, oxygen storage capacity, and redox properties of RE-based (RE = Ce, Pr) solid solutions," Catalysis Today, 2004, pp. 245-254, vol. 90.

Mao et al., "High Performance Ce0.35Zr0.55Y0.1O1.95 Rare Earth Oxygen Storage Material," Chinese Journal of Inorganic Chemistry, 2006, pp. 1521-1524, vol. 22, No. 8.

Ming et al., "The Application of Ceria-Zirconia Composite Oxide in Motorcycle Catalyst," Rare Metal Materials and Engineering, 2007, pp. 277-281, vol. 36.

Shen et al., "Influence of Surfactant on Performance of CeZrYO Oxygen Storage Material," Chinese Journal of Catalysis, 2007, pp. 1067-1071, vol. 28, No. 12.

Wang et al., "Synthesis and characterization of wormhole-like mesoporous Ce0.6Zr0.35Y0.05O2 solid solutions," Chinese Science Bulletin, 2007, pp. 175-180, vol. 52, No. 2.

Wang et al., "Preparation and Properties of Low Cerium Content Ce—Zr—Y Oxygen Storage Material with High Thermal Stability and High Specific Surface Area," Chemical Journal of Chinese Universities, 2006, pp. 944-947, vol. 27, No. 5.

Zhang et al., "Preparation and Characterization of BaCe0.5Zr0.4Y0.1O3-δ via Sol-Gel Method and Solid State Reaction," Journal of the Chinese Rare Earth Society, 2008, pp. 409-415, vol. 26, No. 4.

Zhang et al., "Synthesis, Characterization and Catalytic Properties of Three-dimensional Wormhole-like Mesoporous Ag2O/Ce0.6Zr0.35Y0.05O2 Nanoparticles in Methane Oxidation," 2007, pp. 1929-1934, vol. 28, No. 10.

International Search Report issued on Feb. 3, 2012, by the European Patent Office as the International Searching Authority in International Patent Application No. PCT/EP2011/056907.

* cited by examiner

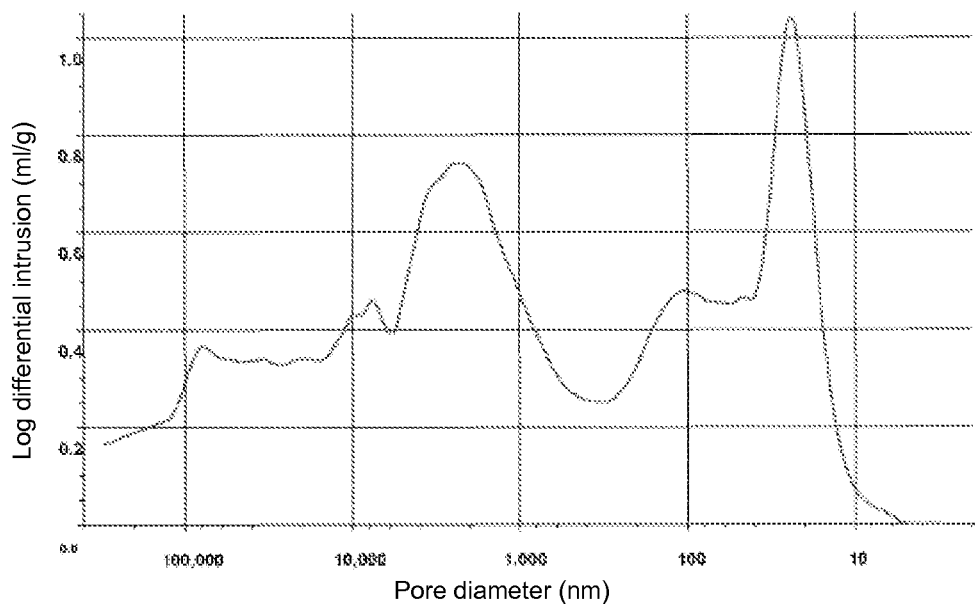

COMPOSITION CONTAINING OXIDES OF ZIRCONIUM, CERIUM AND AT LEAST ONE OTHER RARE EARTH AND HAVING A SPECIFIC POROSITY, METHOD FOR PREPARING SAME AND USE THEREOF IN CATALYSIS

CROSS-REFERENCE TO PRIOR APPLICATIONS

This application is a National Stage of PCT/EP2011/056907, filed May 2, 2011, and designating the United States (published in French on Nov. 10, 2011, as WO 2011/138255 A2; the title and abstract were published in English), which claims priority to FR 10/01947, filed May 6, 2010, each hereby expressly incorporated by reference in its entirety and each assigned to the assignee hereof.

The present invention relates to a composition containing zirconium oxide, cerium oxide and at least one oxide of a rare earth other than cerium, which has a specific porosity, to the process for preparing same and to the use thereof for catalysis.

"Multifunctional" catalysts are currently used for processing exhaust gases from internal combustion engines (automobile afterburning catalysis). The term "multifunctional" is understood to mean catalysts capable of carrying out not only oxidation, in particular of carbon monoxide and of hydrocarbons present in the exhaust gases, but also reduction, in particular of nitrogen oxides also present in these gases ("three-way" catalysts). The zirconium oxide and cerium oxide today appear to be two particularly important and advantageous constituents for catalysts of this type.

The products of this type must have a porosity suitable for their use. Thus, they must have a sufficiently high pore volume and thus comprise pores of sufficiently large size to allow good diffusion of the gases.

However, these same products must also have pores which are small in size, since it is these pores which contribute to giving the products a specific surface area that is sufficiently high for them to be usable in catalysis.

It is therefore advantageous to find a good balance between a large surface area, provided by the small pores, and a better gas diffusion provided by the large pores.

The object of the invention is to propose a product which has a high pore volume and both large pores and small pores.

With this aim, the composition of the invention contains zirconium oxide, cerium oxide and yttrium oxide or it contains zirconium oxide, cerium oxide and at least two oxides of two rare earths other than cerium, in a weight proportion of zirconium oxide of at least 20% and of cerium oxide of at most 70%, and it is characterized in that it exhibits, after calcination at a temperature of 900° C. for 4 hours, two populations of pores of which the respective diameters are centered, for the first population, about a value of between 20 and 40 nm and, for the second population, about a value of between 80 nm and 200 nm.

Other features, details and advantages of the invention will emerge even more completely on reading the description and the appended drawing in which:

FIG. 1 is a curve obtained from a pore size plot of a product according to the invention.

For the rest of the description, the term "specific surface area" is intended to mean the B.E.T. specific surface area determined by nitrogen adsorption in accordance with standard ASTM D 3663-78 established from the Brunauer-Emmett-Teller method described in the periodical "The Journal of the American Chemical Society, 60, 309 (1938)".

For the present description, the term "rare earth" is intended to mean the elements of the group consisting of yttrium and the elements of the periodic table with an atomic number inclusively between 57 and 71.

In addition, the calcinations for a given temperature and a given time correspond, unless otherwise indicated, to calcinations in air at a temperature hold over the period of time indicated.

The contents are given in weight of oxide unless otherwise indicated. The cerium oxide is in the form of ceric oxide, while the oxides of the other rare earths are in the form of $Ln_2O_3$, Ln denoting the rare earth, with the exception of praseodymium expressed in the form of $Pr_6O_{11}$.

It is specified for the rest of the description that, unless otherwise indicated, in the ranges of values which are given, the values at the limits are included.

The compositions according to the invention are first of all characterized by the nature of their constituents.

The compositions of the invention contain zirconium oxide, cerium oxide and, according to a first embodiment, an yttrium oxide. According to a second embodiment, the compositions of the invention also contain zirconium oxide and cerium oxide and they comprise, in addition, oxides of at least two other rare earths which are different than cerium. The compositions of the invention can thus contain three, four or, according to another preferred embodiment, five oxides, i.e., in this case, the compositions contain three other rare earths different than cerium.

The rare earths other than cerium can be more particularly selected from yttrium, lanthanum, neodymium, praseodymium or gadolinium. Mention may more particularly be made of the compositions containing zirconium oxide, cerium oxide, yttrium oxide, neodymium oxide and lanthanum oxide or else containing zirconium oxide, cerium oxide, yttrium oxide, praseodymium oxide and lanthanum oxide.

The zirconium oxide content is at least 20%. This content can be more particularly at least 25% or even more particularly at least 40%. More specifically, this content can be at least 45%, preferably at least 55%. Mention may thus be made of a zirconium content that will be between 40% and 80% and more particularly between 50% and 75%.

The cerium oxide content is at most 70% and more particularly at most 50% and even more particularly at most 45% or 40%. The minimum amount of cerium is not essential. Preferably, however, it is at least 0.1% and more particularly at least 1% and even more particularly at least 5%. It can thus be between 5% and 45% and in particular between 10% and 40%.

The yttrium oxide content, or more generally the content of oxides of all the rare earths other than cerium, is generally at most 30%, more particularly at most 20% and at least 4%, preferably at least 5% and in particular at least 10%. It can in particular be between 10% and 30% and especially between 10% and 25%.

In the case of compositions containing only yttrium oxide, the values given above apply likewise, however this yttrium content may be more particularly between 7% and 25%.

As was seen above, one of the main features of the compositions of the invention is their porosity.

Thus, the compositions of the invention exhibit two quite distinct pore populations which are centered about the values given above.

It is indicated here and for all of the description that the porosities indicated are measured by mercury intrusion porosimetry in accordance with standard ASTM D 4284-83 (Standard method for determining pore volume distribution of catalysts by mercury intrusion porosimetry).

The porosity measurement method given above makes it possible to establish, in a known manner, pore size plots which give the pore volume as a function of the pore size (V=f(d), V denoting the pore volume and d denoting the pore diameter). From this pore size plot, it is possible to obtain, still in a known manner, a curve (C) giving the derivative of V as a function of d. This curve may have peaks according to the diameter of the pores.

For the purpose of the invention, the expression "population of pores of which the diameters are centered about a given value" is intended to mean the presence, in the curve (C), of a peak, the maximum of which is located at this given value. In addition, it should be noted that, when it is indicated that the compositions of the invention exhibit one or two pore populations, after calcination at a given temperature, this does not exclude that there may be other pore populations. In fact, the pores which are considered to be features of the invention are mesopores or even macropores, i.e. pores of which the diameter is at most 350 nm. In other words, the compositions of the invention have pores in a range of from approximately 1 nm to approximately 350 nm.

Thus, as indicated above, after calcination at a temperature of 900° C. for 4 hours, these compositions exhibit, in the pore range given above of approximately 1 nm to approximately 350 nm, two pore populations. The first population corresponds to pores of which the diameters are centered about a value of between 20 nm and 40 nm, especially between 20 nm and 35 nm and more particularly between 20 and 30 nm and even more particularly around 25 nm. The second population corresponds to pores of which the diameters are centered about a value of between 80 nm and 200 nm, especially between 80 nm and 150 nm and more particularly between 80 nm and 130 nm. This value may also be between 90 nm and 150 nm and more particularly between 90 nm and 110 nm and even more particularly around 100 nm.

After calcination at higher temperatures, the porosity of the compounds of the invention changes. Thus, after calcination at 1000° C. for 4 hours, they exhibit a population of pores of which the diameter is centered about a value of between 30 nm and 40 nm and more particularly around 35 nm. At this temperature, the compositions of the invention exhibit this abovementioned pore population in a pore range of from approximately 1 nm to approximately 350 nm, more particularly from approximately 1 nm to approximately 300 nm.

Moreover, after calcination at 1100° C. for 4 hours, they exhibit a population of pores of which the diameter is centered about a value of between 30 nm and 70 nm, more particularly around 50 nm. At this temperature, the compositions of the invention exhibit this abovementioned pore population in a pore range of from approximately 1 nm to approximately 350 nm, more particularly from approximately 1 nm to approximately 300 nm.

The presence of a pore population centered about the values described above offers a good balance between the thermal stability of the specific surface area and the gas diffusion.

The compositions of the invention have, moreover, a total pore volume of at least 1.5 ml Hg/g, this pore volume being measured on compositions having undergone calcination at a temperature of 900° C. for 4 hours. This total pore volume can be in particular at least 1.6 ml Hg/g, more particularly at least 1.7 ml and even more particularly at least 1.8 ml Hg/g. Under these same calcination conditions, pore volumes of at least approximately 2.2 ml Hg/g can be obtained.

The total pore volume of the compositions measured after calcination at 1000° C. for 4 hours is at least 1.5 ml Hg/g and at least 0.9 ml Hg/g at 1100° C. for 4 hours. At 1000° C., pore volumes up to at least approximately 1.9 ml Hg/g can be obtained, and, at 1100° C., up to at least approximately 1.3 ml Hg/g.

According to one particular embodiment in which the compositions contain at least two oxides of two rare earths other than cerium, and in which one of these rare earths is lanthanum, and for a zirconium oxide content which is at least approximately 60%, the compositions according to this embodiment may, after calcination at 1000° C. for 4 hours, be in the form of two different crystallographic phases, at least one of which is cubic in nature.

These crystallographic structures are demonstrated by the XR diffraction patterns of the compositions of the invention. These same XR patterns make it possible to determine, by means of the Scherrer formula, a crystallite size measured on the most intense peaks of at most 8 nm.

The compositions of the invention have a high specific surface area owing in particular to their specific porosity.

Therefore, after calcination at 1100° C. for 4 hours, they have, for the compositions having a zirconium oxide content of at least 45%, a specific surface area of at least 25 $m^2/g$, more particularly of at least 27 $m^2/g$, in particular in the case where the content of rare earth other than cerium is higher. Surface area values of at least 33 $m^2/g$ can be obtained.

After calcination at 1150° C. for 10 hours, they can have a specific surface area of at least 7 $m^2/g$, preferably of at least 10 $m^2/g$. Surface area values of at least 18 $m^2/g$ can be obtained.

After calcination at 1200° C. for 10 hours, the compositions of the invention can have a specific surface area of at least 2 $m^2/g$, preferably of at least 4 $m^2/g$ and even more particularly of at least 6 $m^2/g$. Surface area values of up to approximately 12 $m^2/g$ can be obtained.

Probably also owing to their specific porosity, the compositions of the invention have the advantage of an oxygen storage and release capacity (OSC) which is improved compared with products which do not exhibit two pore populations. This improvement will be apparent on reading the examples given at the end of the description.

The process for preparing the compositions of the invention will now be described.

This process comprises the following steps:
(a1) a mixture is formed comprising either zirconium and cerium compounds only or these compounds with one or more compounds of rare earths other than cerium, in an amount of the latter compound(s) which is less than the amount required to obtain the desired composition;
(b1) said mixture is brought together with a basic compound, with stirring;
(c1) the medium obtained in the preceding step is brought together, with stirring, with either the compound(s) of rare earths other than cerium if this or these compound(s) was (were) not present in step (a1), or the required remaining amount of said compound(s), the stirring energy used during step (c1) being less than that used during step (b1);
(d1) said precipitate is heated in an aqueous medium;
(e1) an additive selected from anionic surfactants, nonionic surfactants, polyethylene glycols, carboxylic acids and their salts and surfactants of the carboxy-methylated fatty alcohol ethoxylate type is added to the precipitate obtained in the preceding step;
(f1) the resulting precipitate is calcined.

The first step (a1) of the process therefore consists in preparing a mixture of some of the compounds of the constituent elements of the composition that it is sought to prepare. The mixing is generally carried out in a liquid medium which is preferably water.

This step (a1) can be carried out according to two variants.

In the case of the first variant, which is a preferred variant, the mixture formed in step (a1) comprises, with regard to the constituent elements of the composition, i.e. the zirconium, cerium and yttrium or other rare earths, only the zirconium and cerium compounds.

In the case of the second variant, the mixture formed in step (a1) comprises, in addition to the zirconium and cerium compounds, the compound(s) of the other rare earths different than cerium, but in an amount which is less than the required total stoichiometric amount of this or these compound(s) of other rare earths for obtaining the desired composition. This amount may more particularly be at most equal to half the total amount.

Thus, for example in the case of the compositions containing zirconium oxide, cerium oxide and yttrium oxide, according to this second variant, the yttrium compound will be present in step (a1) in an amount which is less than the required total stoichiometric amount for the composition. The same is true for the compositions containing zirconium oxide, cerium oxide and oxides of at least two other rare earths, the amount of the compounds of these other rare earths in step (a1) being less than the required total stoichiometric amount.

It will be noted that this second variant should be understood to cover the case, for the compositions containing zirconium oxide, cerium oxide and oxides of at least two other rare earths, where, in step (a1), the required total amount of compound of at least one of the rare earths is present right from this step and where it is only for at least one of the other remaining rare earths that the amount of the compound of this other rare earth is less than the amount required. It is also possible for the compound of this other rare earth to be absent in this step (a1).

The compounds are preferably soluble compounds. They may in particular be zirconium, cerium and rare earth salts. These compounds may be selected from the nitrates, sulfates, acetates, chlorides and ceric ammonium nitrate.

By way of examples, mention may thus be made of zirconium sulfate, zirconyl nitrate or zirconyl chloride.

The zirconyl sulfate may originate from placing crystalline zirconyl sulfate in solution. It may also have been obtained by dissolution of zirconium basic sulfate with sulfuric acid, or else by dissolution of zirconium hydroxide with sulfuric acid. In the same way, the zirconyl nitrate may originate from placing crystalline zirconyl nitrate in solution or else it may have been obtained by dissolution of zirconium basic carbonate or else by dissolution of zirconium hydroxide with nitric acid.

It may be advantageous to use a zirconium compound in the form of a combination or of a mixture of the abovementioned salts. Mention may, for example, be made of the combination of zirconium nitrate with zirconium sulfate, or else the combination of zirconium sulfate with zirconyl chloride. The respective proportions of the various salts can vary to a large extent, from 90/10 to 10/90 for example, these proportions denoting the contribution of each of the salts in grams of total zirconium oxide.

For the cerium, mention may also in particular be made of cerium IV salts, such as the nitrate or ceric ammonium nitrate for example, which are particularly suitable here. Preferably, ceric nitrate is used. An aqueous solution of ceric nitrate can, for example, be obtained by reacting nitric acid with a ceric oxide hydrate prepared conventionally by reacting a solution of a cerous salt, for example cerous nitrate, and a solution of aqueous ammonia in the presence of aqueous hydrogen peroxide. Use may also preferably be made of a solution of ceric nitrate obtained according to the process of electrolytic oxidation of a cerous nitrate solution as described in FR-A-2 570 087, and which here constitutes an advantageous raw material.

It will be noted here that the aqueous solutions of cerium salts and of zirconyl salts can have a certain initial free acidity which can be adjusted by adding a base or an acid. It is, however, just as possible to use an initial solution of cerium and zirconium salts actually having a certain free acidity as mentioned above, as it is to use solutions that have been neutralized beforehand to a lesser or greater extent. This neutralization can be carried out by adding a basic compound to the abovementioned mixture so as to limit this acidity. This basic compound may, for example, be a solution of aqueous ammonia or else of alkali metal (sodium, potassium, etc.) hydroxides, but preferably a solution of aqueous ammonia.

It will be noted that, when the starting mixture contains cerium in form III, it is preferable to involve an oxidizing agent, for example aqueous hydrogen peroxide, during the process. This oxidizing agent may be used by adding it to the reaction medium during step (a1), during step (b1) or else at the beginning of step (c1).

It is advantageous to use salts with a purity of at least 99.5% and more particularly of at least 99.9%.

Finally, it is also possible to use a sol as starting zirconium or cerium compound. The term "sol" denotes any system consisting of fine solid particles of colloidal dimensions, i.e. dimensions of between approximately 1 nm and approximately 200 nm, containing a zirconium or cerium compound, this compound generally being a zirconium or cerium oxide and/or oxide hydrate, in suspension in an aqueous liquid phase.

The mixture can without distinction be obtained either from compounds initially in the solid state, and will subsequently be introduced into a vessel heel of water for example, or else directly from solutions or suspensions of these compounds followed by mixing, in any order, of said solutions or suspensions.

In the second step (b1) of the process, said mixture is brought together with a basic compound in order to react them. Products of the hydroxide type can be used as base or basic compound. Mention may be made of alkali metal or alkaline-earth metal hydroxides. Use may also be made of secondary, tertiary or quaternary amines. However, amines and aqueous ammonia may be preferred since they reduce the risks of pollution by alkali metal or alkaline-earth metal cations. Mention may also be made of urea.

The basic compound may be more particularly used in the form of a solution. Finally, it may be used with a stoichiometric excess in order to be sure of optimum precipitation.

This bringing together is carried out with stirring. It can be carried out in any way, for example by adding a preformed mixture of the compounds of the above-mentioned elements to the basic compound in the form of a solution.

The next step (c1) of the process consists in bringing the medium resulting from the preceding step (b1) together with the compounds of rare earths other than cerium. In the case of the first variant mentioned above, in which the starting mixture formed in step (a1) comprises, as constituent elements of the composition, only the zirconium and cerium compounds, these compounds are therefore introduced for the first time in the process and in the required total stoichio-metric amount of these other rare earths. In the case of the second variant, in which the mixture formed in step (a1) already comprises compounds of other rare earths different than cerium, it is therefore a question of the required remaining amount of these compounds or, optionally, of the required amount of the compound of a rare earth if this compound was not present in step (a1).

This bringing together can be carried out in any way, for example by adding a preformed mixture of the compounds of rare earths other than cerium to the mixture obtained at the end of step (b1). It is also carried out with stirring, but under conditions such that the stirring energy used during this step (c1) is less than that used during step (b1). More specifically, the energy used during step (c1) is at least 20% less than that of step (b1) and it may be more particularly less than 40% and even more particularly than 50% thereof.

At the end of step (c1) a precipitate in suspension in the reaction medium is obtained.

The next step (d1) of the process is the step of heating this precipitate in this medium.

This heating can be carried out directly on the reaction medium obtained at the end of step (c1) or on a suspension obtained after separating the precipitate from the reaction medium, optionally washing, and putting the precipitate back into water. The temperature to which the medium is heated is at least 100° C. and even more particularly at least 130° C. It can be between, for example, 100° C. and 160° C. The heating operation can be carried out by introducing the liquid medium into a closed chamber (closed reactor of the autoclave type). Under the temperature conditions given above, and in an aqueous medium, it can thus be specified, by way of illustration, that the pressure in the closed reactor can range between an upper value at 1 bar ($10^5$ Pa) and 165 bar ($1.65 \times 10^7$ Pa), preferably between 5 bar ($5 \times 10^5$ Pa) and 165 bar ($1.65 \times 10^7$ Pa). The heating can also be carried out in an open reactor for temperatures of about 100° C.

The heating can be carried out either under air, or under an inert gas, preferably nitrogen, atmosphere.

The heating time can vary within broad limits, for example between 1 and 48 hours, preferably between 2 and 24 hours. Likewise, the increase in temperature is carried out at a rate which is not essential, and it is thus possible to reach the fixed reaction temperature by heating the medium for, for example, between 30 minutes and 4 hours, these values being given entirely by way of indication.

It is possible to carry out several heating operations. Thus, the precipitate obtained after the heating step and optionally washing can be resuspended in water and then a further heating of the resulting medium can be carried out. This further heating is carried out under the same conditions as those that were described for the first one.

The next step (e1) of the process consists in adding, to the precipitate resulting from the preceding step, an additive which is selected from anionic surfactants, nonionic surfactants, polyethylene glycols and carboxylic acids and their salts and also surfactants of the carboxymethylated fatty alcohol ethoxylate type.

With regard to this additive, reference may be made to the teaching of application WO-98/45212 and the surfactants described in this document may be used.

As surfactants of anionic type, mention may be made of ethoxycarboxylates, ethoxylated fatty acids, sarcosinates, phosphate esters, sulfates such as alcohol sulfates, alcohol ether sulfates and sulfated alkanolamide ethoxylates, and sulfonates such as sulfo-succinates, and alkylbenzene or alkylnapthalene sulfonates.

As nonionic surfactants, mention may be made of acetylenic surfactants, alcohol ethoxylates, alkanolamides, amine oxides, ethoxylated alkanolamides, long-chain ethoxylated amines, copolymers of ethylene oxide/propylene oxide, sorbitan derivatives, ethylene glycol, propylene glycol, glycerol, polyglyceryl esters and ethoxylated derivatives thereof, alkylamines, alkylimidazolines, ethoxylated oils and alkylphenol ethoxylates. Mention may in particular be made of the products sold under the brands Igepal®, Dowanol®, Rhodamox® and Alkamide®.

With regard to the carboxylic acids, it is in particular possible to use aliphatic monocarboxylic or dicarboxylic acids and, among these, more particularly saturated acids. Fatty acids and more particularly saturated fatty acids may also be used. Mention may thus in particular be made of formic acid, acetic acid, propionic acid, butyric acid, isobutyric acid, valeric acid, caproic acid, caprylic acid, capric acid, lauric acid, myristic acid and palmitic acid. As dicarboxylic acids, mention may be made of oxalic acid, malonic acid, succinic acid, glutaric acid, adipic acid, pimelic acid, suberic acid, azelaic acid and sebacic acid.

Salts of the carboxylic acids may also be used, in particular the ammoniacal salts.

By way of example, mention may be made more particularly of lauric acid and ammonium laurate.

Finally, it is possible to use a surfactant which is selected from those of the carboxymethylated fatty alcohol ethoxylate type.

The expression "product of the carboxymethylated fatty alcohol ethoxylate type" is intended to mean products consisting of ethoxylated or propoxylated fatty alcohols comprising a $CH_2$—COOH group at the end of the chain.

These products may correspond to the formula:

$$R_1\text{—O—}(CR_2R_3\text{—}CR_4R_5\text{—O})_n\text{—}CH_2\text{—COOH}$$

in which $R_1$ denotes a saturated or unsaturated carbon-based chain of which the length is generally at most 22 carbon atoms, preferably at least 12 carbon atoms; $R_2$, $R_3$, $R_4$ and $R_5$ may be identical and may represent hydrogen or else $R_2$ may represent a $CH_3$ group and $R_3$, $R_4$ and $R_5$ represent hydrogen; n is a non-zero integer that may be up to 50 and more particularly between 5 and 15, these values being included. It will be noted that a surfactant may consist of a mixture of products of the formula above for which $R_1$ may be saturated or unsaturated, respectively, or alternatively products comprising both —$CH_2$—$CH_2$—O— and —C($CH_3$)—$CH_2$—O— groups.

The surfactant can be added in two ways. It can be added directly to the suspension of precipitate resulting from the preceding heating step (d1). It can also be added to the solid precipitate after separation thereof, by any known means, from the medium in which the heating took place.

The amount of surfactant used, expressed as percentage by weight of additive relative to the weight of the composition calculated as oxide, is generally between 5% and 100% and more particularly between 15% and 60%.

According to another advantageous variant of the invention, before implementing the final step of the process (calcination step), washing of the precipitate is carried out after having separated it from the medium in which it was in suspension. This washing can be carried out with water, preferably with water at basic pH, for example aqueous ammonia solution.

In a final step of the process of the invention, the precipitate recovered is subsequently calcined. This calcination makes it possible to develop the crystallinity of the product formed and it can also be adjusted and/or selected according to the subsequent operating temperature intended for the composition according to the invention, this being done while taking into account the fact that the specific surface area of the product decreases as the calcination temperature used increases. Such a calcination is generally carried out under air, but a calcination carried out, for example, under inert gas or under a controlled atmosphere (oxidizing or reducing) is very clearly not excluded.

In practice, the calcination temperature is generally limited to a range of values of between 500 and 900° C. and more particularly between 700° C. and 800° C.

The duration of the calcination is not critical and depends on the temperature. Purely by way of indication, it can be at least 2 hours and more particularly between 2 hours and 4 hours.

The invention also relates to another embodiment of the process which will be described below.

The process according to this second embodiment comprises the following steps:
- (a2) zirconium and cerium compounds are brought together, in liquid phase, with a basic compound, as a result of which a precipitate is formed;
- (b2) said precipitate is heated in an aqueous medium;
- (c2) an additive selected from anionic surfactants, nonionic surfactants, polyethylene glycols, carboxylic acids and their salts and surfactants of the carboxy-methylated fatty alcohol ethoxylate type is added to the precipitate obtained in the preceding step;
- (d2) the precipitate resulting from the preceding step is calcined at a temperature of at most 500° C.;
- (e2) a liquid-phase mixture comprising the product resulting from the preceding step and one or more compounds of rare earths other than cerium is formed;
- (f2) this mixture is brought together with a basic compound;
- (g2) the solid product resulting from the preceding step is heated in an aqueous medium;
- (h2) the product obtained at the end of the preceding step is calcined.

Step (a2) is similar to step (a1) of the first embodiment described above, such that everything that has been described for step (a1), in particular with regard to the nature of the zirconium and cerium compounds, applies likewise here. In the same way as at the end of step (a1), a precipitate is obtained here. Step (b2) is, moreover, carried out under the same conditions as those given for step (d1) of the first embodiment. The same is also true for step (c2), i.e. the same types of additive as those described with regard to step (e1) are used, and under the same conditions. At the end of the addition of the additive, washing of the precipitate can be carried out, as in the previous embodiment.

Finally, after separation of the solid product from the liquid medium obtained at the end of step (c2), calcination of this product is carried out under conditions similar to those described for step (f1), but in a temperature range which is generally lower. Thus, the calcination temperature in step (d2) is at most 500° C. It may be, for example, between 150° C. and 500° C. and more particularly between 200° C. and 300° C.

The process of the second embodiment comprises additional steps in which the compound(s) of rare earths other than cerium is (are) used. That which has been described with regard to these compounds for the first embodiment applies likewise here.

In a step (e2), a mixture in liquid phase, generally water, comprising the product resulting from the preceding step (d2) and one or more compounds of rare earths other than cerium is formed. This mixture is subsequently brought together (step (f2)) with a basic compound of the same type as that described above, for example, for step (b1) and it is possible to use the basic compound with a stoichiometric excess.

At the end of step (f2), a liquid medium is obtained, containing a solid or precipitate in suspension which, in the next step (g2), is heated under the same conditions as those previously described for step (d1).

In a final step (h2), the solid or precipitate obtained at the end of the preceding step is recovered by any known means and is subjected to calcination. The conditions for this calcination can be identical to those described for step (f1).

The invention also relates to a third embodiment of the process, which comprises the following steps:
- (a3) either zirconium and cerium compounds only, or these compounds with one or more compounds of rare earths other than cerium in an amount of the latter compound(s) which is less than the amount required to obtain the desired composition, are brought together, in liquid phase, with a basic compound, as a result of which a precipitate is formed;
- (b3) said precipitate is heated in an aqueous medium;
- (c3) the medium obtained in the preceding step is brought together with either one or more compounds of rare earths other than cerium, if these compounds were not present in step (a3), or the required remaining amount of said compounds;
- (d3) the medium obtained in the preceding step is brought together with a basic compound;
- (e3) an additive selected from anionic surfactants, nonionic surfactants, polyethylene glycols, carboxylic acids and their salts and surfactants of the carboxy-methylated fatty alcohol ethoxylate type is added to the precipitate obtained in the preceding step;
- (f3) the resulting precipitate is calcined.

The process of this third embodiment is similar to that of the first embodiment, but it differs therefrom essentially in terms of the order of the steps. As a result, what has been described above for step (a1) combined with steps (b1), (d1) and (f1), applies to steps (a3), (b3), and (f3), respectively. In addition, the preceding description for the rare earth compounds, the additive of the surfactant type, the basic compound and more generally the conditions for implementing steps (c1), (b1) and (e1) applies likewise here for steps (c3), (d3) and (e3).

Variants can be envisioned for each of the three process embodiments described above, it being possible for these variants to allow the pore distribution to be controlled.

Thus, it is possible to adjust the ionic strength of the liquid-phase mixture of step (a1) or (a3) before it is brought together with the basic compound. It is also possible to form a solution of the zirconium and cerium compounds prior to step (a2) and to adjust the ionic strength of this solution before bringing it together with the basic compound. This adjustment of the ionic strength is carried out by adding to said mixture or to said solution additional ions selected from sulfate, chloride and nitrate ions, for example by adding sulfuric acid or ammonium sulfate in a solution of zirconyl nitrate, of zirconyl chloride, or of a mixture of the two.

The basic compound of one of steps (b1), (a2) and (a3) can also be used in the form of a solution, the ionic strength of which is adjusted before the precipitation by addition to said solution of a salt selected from ammonium nitrate, ammonium sulfate and ammonium chloride.

The amount of ions added during this adjustment of the ionic strength can vary to a large extent. Expressed in number of moles of ions added by number of moles of zirconium ions present, it can range from 0.1 to 2.

The compositions of the invention as described above or as obtained by means of the preparation process previously described are in the form of powders, but they can optionally be formed so as to be in the form of granules, beads, cylinders or honeycombs of variable dimensions.

These compounds can be used with any material customarily employed in the field of catalyst formulation, i.e. in particular thermally inert materials. This material may be selected from alumina, titanium oxide, cerium oxide, zirconium oxide, silica, spinels, zeolites, silicates, crystalline silico-aluminum phosphates or crystalline aluminum phosphates.

The compositions may also be used in catalytic systems comprising a coating (wash coat) with catalytic properties and based on these compositions with a material of the type of those mentioned above, the coating being deposited on a substrate of for example the metallic monolith type, for example Fecralloy, or made of ceramic, for example of cordierite, of silicon carbide, of alumina titanate or of mullite.

This coating is obtained by mixing the composition with the material so as to form a suspension which can subsequently be deposited on the substrate.

These catalytic systems and more particularly the compositions of the invention can have a great many applications.

They are thus particularly suitable for, and therefore can be used in, the catalysis of various reactions such as, for example, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization, of hydrocarbons or other organic compounds, oxidation and/or reduction reactions, the Claus reaction, processing of exhaust gases from internal combustion engines, demetallation, methanation, the shift conversion, or the catalytic oxidation of the soot emitted by internal combustion engines, such as diesel engines or petrol engines operating under lean burn conditions.

Finally, the catalytic systems and the compositions of the invention can be used as $NO_x$ traps or to promote the reduction of $NO_x$ compounds, even in an oxidizing medium.

In the case of these uses in catalysis, the compositions of the invention are employed in combination with precious metals; they thus act as a support for these metals. The nature of these metals and the techniques for incorporating the latter into the support compositions are well known to those skilled in the art. For example, the metals may be platinum, rhodium, palladium or iridium, and they can in particular be incorporated into the compositions by impregnation.

Among the uses mentioned, the processing of exhaust gases from internal combustion engines (automobile afterburning catalysis) constitutes a particularly advantageous application.

As a result, the invention also relates to a process for processing the exhaust gases from internal combustion engines which is characterized in that use is made, as catalyst, of a catalytic system as described above or a composition according to the invention and as previously described.

Examples will now be given.

EXAMPLE 1

This example relates to the preparation, according to the first variant of the first step of the process of the invention, of a composition containing zirconium oxide, cerium oxide, lanthanum oxide, yttrium oxide and neodymium oxide in the following respective proportions as weight percentage of the oxides: 75%-10%-2%-8%-5%.

Two solutions of nitrates are prepared beforehand, one consisting of cerium nitrate and zirconium nitrate and the other of lanthanum nitrate, yttrium nitrate and neodymium nitrate. 0.39 l of water is introduced into a first beaker with 0.25 l of zirconium nitrate ($[ZrO_2]$=288 g/l and d=1.433) and also 0.04 l of cerium nitrate ($[CeO_2]$=246 g/l and d=1.43).

76.6 ml of water, 4.1 ml of lanthanum nitrate ($[La_2O_3]$=471 g/l and d=1.69), 29.4 ml of yttrium nitrate ($[Y_2O_3]$=261 g/l and d=1.488) and 9.9 ml of neodymium nitrate ($[Nd_2O_3]$=484 g/l and d=1.743) are introduced into a second beaker.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring.

The first solution of nitrates is introduced, over the course of 45 minutes, into the reactor stirred at a speed of 500 rpm, the second solution of nitrates is introduced over the course of 15 minutes and the stirring is fixed at 250 rpm.

The resulting precipitate suspension is placed in a stainless steel autoclave equipped with a stirring rotor.

The temperature of the medium is brought to 150° C. for 2 hours with stirring.

33 grams of lauric acid are added to the resulting suspension. The suspension is kept stirring for 1 hour.

The suspension is then filtered through a Büchner funnel, and then washed with aqueous ammonia solution.

The product obtained is then calcined at 700° C. for a hold of 4 hours.

EXAMPLE 2

This example relates to the preparation, according to the second variant of the first step of the process of the invention, of a composition identical to that of example 1.

The solutions of zirconium nitrate, cerium nitrate, lanthanum nitrate, yttrium nitrate and neodymium nitrate used in this example have the same characteristics as those used in example 1.

Two solutions of nitrates are prepared beforehand, one consisting of cerium nitrate and zirconium nitrate with 50% of the other rare earth elements of the composition, and the other consisting of nitrates of the remaining amount (50%) of these same other elements.

0.41 l of water is introduced into a first beaker with 0.275 l of zirconium nitrate and also 0.038 l of cerium nitrate, 2.1 ml of lanthanum nitrate, 15.2 ml of yttrium nitrate and, finally, 5 ml of neodymium nitrate. 37.7 ml of water, 2.1 ml of lanthanum nitrate, 15.2 ml of yttrium nitrate and 5 ml of neodymium nitrate are introduced into a second beaker.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring.

The first solution of nitrates is introduced, over the course of 45 minutes, into the reactor stirred at a speed of 500 rpm, the second solution of nitrates is introduced over the course of 15 minutes and the stirring is fixed at 200 rpm.

The resulting precipitate suspension is placed in an autoclave and the process is then carried out (autoclaving, addition and amount of lauric acid, washing and calcination) as in example 1.

EXAMPLE 3

This example relates to the preparation, according to the first variant of the first step of the process of the invention, of a composition containing zirconium oxide, cerium oxide, lanthanum oxide, yttrium oxide and neodymium oxide in the following respective proportions as weight percentage of the oxides: 60%-25%-2%-8%-5%.

The solutions of zirconium nitrate, cerium nitrate, lanthanum nitrate, yttrium nitrate and neodymium nitrate used in this example have the same characteristics as those used in example 1.

Two solutions of nitrates are prepared beforehand, one consisting of cerium nitrate and zirconium nitrate, and the other of lanthanum nitrate, yttrium nitrate and neodymium nitrate. 0.382 l of water is introduced into a first beaker with 0.2 l of zirconium nitrate and also 97.6 ml of cerium nitrate. 76.6 ml of water, 4.1 ml of lanthanum nitrate, 29.4 ml of yttrium nitrate and 9.9 ml of neodymium nitrate are introduced into a second beaker.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring. The first solution of nitrates is introduced, over the course of 45 minutes, into the reactor stirred at a speed of 500 rpm, the second solution of nitrates is introduced over the course of 15 minutes and the stirring is fixed at 250 rpm.

The resulting precipitate suspension is placed in a stainless steel autoclave equipped with a stirring rotor. The temperature of the medium is brought to 150° C. for 1 hour with stirring.

The process is then carried out (addition and amount of lauric acid, washing and calcination) as in example 1.

EXAMPLE 4

This example relates to the preparation, according to the first variant of the first step of the process of the invention, of a composition containing zirconium oxide, cerium oxide, lanthanum oxide, yttrium oxide and neodymium oxide in the following respective proportions as weight percentage of the oxides: 45%-40%-2%-8%-5%.

The solutions of zirconium nitrate, cerium nitrate, lanthanum nitrate, yttrium nitrate and neodymium nitrate used in this example have the same characteristics as those used in example 1.

Two solutions of nitrates are prepared beforehand, one consisting of cerium nitrate and zirconium nitrate and the other of lanthanum nitrate, yttrium nitrate and neodymium nitrate. 0.37 l of water is introduced into a first beaker with 0.15 l of zirconium nitrate and also 0.156 l of cerium nitrate. 76.6 ml of water, 4.1 ml of lanthanum nitrate, 29.4 ml of yttrium nitrate and 9.9 ml of neodymium nitrate are introduced into a second beaker.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring. The first solution of nitrates is introduced, over the course of 45 minutes, into the reactor stirred at a speed of 450 rpm, the second solution of nitrates is introduced over the course of 15 minutes and the stirring is fixed at 200 rpm.

The resulting precipitate suspension is placed in a stainless steel autoclave equipped with a stirring rotor. The temperature of the medium is brought to 125° C. for 1 hour with stirring.

The process is then carried out (addition and amount of lauric acid, washing and calcination) as in example 1.

EXAMPLE 5

This example relates to the preparation, according to the first variant of the first step of the process of the invention, of a composition containing zirconium oxide, cerium oxide, lanthanum oxide, yttrium oxide and neodymium oxide in the following respective proportions as weight percentage of the oxides: 25%-60%-2%-8%-5%.

The solutions of zirconium nitrate, cerium nitrate, lanthanum nitrate, yttrium nitrate and neodymium nitrate used in this example have the same characteristics as those used in example 1.

Two solutions of nitrates are prepared beforehand, one consisting of cerium nitrate and zirconium nitrate and the other of lanthanum nitrate, yttrium nitrate and neodymium nitrate.

0.362 l of water is introduced into a first beaker with 83 ml of zirconium nitrate and also 0.234 l of cerium nitrate. 76.6 ml of water, 4.1 ml of lanthanum nitrate, 29.4 ml of yttrium nitrate and 9.9 ml of neodymium nitrate are introduced into a second beaker.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring. The first solution of nitrates is introduced, over the course of 45 minutes, into the reactor stirred at a speed of 350 rpm, the second solution of nitrates is introduced over the course of 15 minutes and the stirring is fixed at 190 rpm.

The resulting precipitate suspension is placed in a stainless steel autoclave equipped with a stirring rotor. The temperature of the medium is brought to 150° C. for 30 minutes with stirring.

The process is then carried out (addition and amount of lauric acid, washing and calcination) as in example 1.

EXAMPLE 6

This example relates to the preparation, according to the first variant of the first step of the process of the invention, of a composition containing zirconium oxide, cerium oxide, yttrium oxide and neodymium oxide in the following respective proportions as weight percentage of the oxides: 75%-10%-12%-3%.

The solutions of zirconium nitrate, cerium nitrate, yttrium nitrate and neodymium nitrate used in this example have the same characteristics as those used in example 1.

Two solutions of nitrates are prepared beforehand, one consisting of cerium nitrate and zirconium nitrate and the other of yttrium nitrate and neodymium nitrate. 0.39 l of water is introduced into a first beaker with 0.25 l of zirconium nitrate and also 0.039 l of cerium nitrate. 69.9 ml of water, 44.1 ml of yttrium nitrate and 6 ml of neodymium nitrate are introduced into a second beaker.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring. The first solution of nitrates is introduced, over the course of 45 minutes, into the reactor stirred at a speed of 500 rpm, the second solution of nitrates is introduced over the course of 15 minutes and the stirring is fixed at 250 rpm.

The resulting precipitate suspension is placed in an autoclave and the process is then carried out (autoclaving, addition and amount of lauric acid, washing and calcination) as in example 1.

EXAMPLE 7

This example relates to the preparation, according to the first variant of the first step of the process of the invention, of a composition containing zirconium oxide, cerium oxide, lanthanum oxide, yttrium oxide and praseodymium oxide in the following respective proportions as weight percentage of the oxides: 75%-10%-3%-7%-5%.

The solutions of zirconium nitrate, cerium nitrate, lanthanum nitrate and yttrium nitrate used in this example have the same characteristics as those used in example 1.

Two solutions of nitrates are prepared beforehand, one consisting of cerium nitrate and zirconium nitrate and the other consisting of lanthanum nitrate, yttrium nitrate and praseodymium nitrate.

0.39 l of water is introduced into a first beaker with 0.25 l of zirconium nitrate and also 0.039 l of cerium nitrate. 6.1 ml of lanthanum nitrate, 25.7 ml of yttrium nitrate, 9.6 ml of praseodymium nitrate ($[Pr_2O_5]=500$ g/l and d=1.74) and water in order to obtain a solution at 120 g/l are introduced into a second beaker.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring. The first solution of nitrates is introduced, over the course of 45 minutes, into the reactor stirred at a speed of 400 rpm, the second solution of nitrates is introduced over the course of 15 minutes and the stirring is fixed at 250 rpm.

The resulting precipitate suspension is placed in an autoclave and the process is then carried out (autoclaving, addition and amount of lauric acid, washing and calcination) as in example 1.

EXAMPLE 8

This example relates to the preparation, according to the first variant of the first step of the process of the invention, of a composition containing zirconium oxide, cerium oxide, lanthanum oxide, yttrium oxide and neodymium oxide in the following respective proportions as weight percentage of the oxides: 65%-10%-3.4%-13.3%-8.3%.

The solutions of zirconium nitrate, cerium nitrate, lanthanum nitrate, yttrium nitrate and neodymium nitrate used in this example have the same characteristics as those used in example 1.

Two solutions of nitrates are prepared beforehand, one consisting of cerium nitrate and zirconium nitrate and the other of lanthanum nitrate, yttrium nitrate and neodymium nitrate. 0.34 l of water is introduced into a first beaker with 0.22 l of zirconium nitrate and also 0.039 l of cerium nitrate. 0.127 l of water, 6.9 ml of lanthanum nitrate, 0.049 l of yttrium nitrate and 16.5 ml of neodymium nitrate are introduced into a second beaker.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring. The first solution of nitrates is introduced, over the course of 45 minutes, into the reactor stirred at a speed of 500 rpm, the second solution of nitrates is introduced over the course of 15 minutes and the stirring is fixed at 250 rpm.

The resulting precipitate suspension is placed in an autoclave and the process is then carried out (autoclaving, addition and amount of lauric acid, washing and calcination) as in example 1.

EXAMPLE 9

This example relates to the preparation of a compound containing zirconium oxide, cerium oxide, lanthanum oxide and yttrium oxide in the following respective proportions as weight percentage of the oxides: 55%-30%-7.5%-7.5%.

Two solutions of nitrates are prepared beforehand, one consisting of cerium nitrate and zirconium nitrate and the other of lanthanum nitrate and yttrium nitrate.

305 ml of water are introduced into a first beaker with 0.2 l of zirconium nitrate ($[ZrO_2]=265$ g/l and d=1.408) and also 106 ml of cerium nitrate ($[CeO_2]=270$ g/l and d=1.43). 70 ml of water, 15.8 ml of lanthanum nitrate ($[La_2O_3]=454$ g/l and d=1.687) and 19.9 ml of yttrium nitrate ($[Y_2O_3]=361$ g/l and d=1.65) are introduced into a second beaker.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring. The first solution of nitrates is introduced, over the course of 45 minutes, into the reactor stirred at a speed of 500 rpm, the second solution of nitrates is introduced over the course of 15 minutes and the stirring is fixed at 250 rpm.

The resulting precipitate suspension is placed in an autoclave and the process is then carried out (autoclaving, addition and amount of lauric acid, washing and calcination) as in example 1.

EXAMPLE 10

This example relates to the preparation of a composition containing zirconium oxide, cerium oxide, gadolinium oxide and yttrium oxide in the following respective proportions as weight percentage of the oxides: 55%-30%-7.5%-7.5%.

Two solutions of nitrates are prepared beforehand, one consisting of cerium nitrate and zirconium nitrate and the other of lanthanum nitrate and yttrium nitrate.

0.39 l of water is introduced into a first beaker with 0.25 l of zirconium nitrate ($[ZrO_2]=288$ g/l and d=1.433) and also 0.04 l of cerium nitrate ($[CeO_2]=246$ g/l and d=1.43). 76.6 ml of water, 18.8 ml of gadolinium nitrate ($[Gd_2O_3]=383$ g/l and d=1.59) and 29.4 ml of yttrium nitrate ([Y$_2$O$_3$]=261 g/l and d=1.488) are introduced into a second beaker.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring. The first solution of nitrates is introduced, over the course of 45 minutes, into the reactor stirred at a speed of 500 rpm, the second solution of nitrates is introduced over the course of 15 minutes and the stirring is fixed at 250 rpm.

The resulting precipitate suspension is placed in an autoclave and the process is then carried out (autoclaving, addition and amount of lauric acid, washing and calcination) as in example 1.

COMPARATIVE EXAMPLE 11

This example relates to the preparation of a composition identical to that of example 1 by means of a process in which the compounds of rare earths other than cerium are introduced at different steps of the process, as in the previous examples, but with the same stirring energy in each of these steps, contrary to these examples.

The solutions of zirconium nitrate, cerium nitrate, lanthanum nitrate, yttrium nitrate and neodymium nitrate used in this example have the same characteristics as those used in example 1.

Two solutions of nitrates are prepared beforehand, one consisting of cerium nitrate, zirconium nitrate, lanthanum nitrate and yttrium nitrate and the other of neodymium nitrate. 0.41 l of water is introduced into a first beaker with 0.25 l of zirconium nitrate and also 0.04 l of cerium nitrate, 4.1 ml of lanthanum nitrate and 29.4 ml of yttrium nitrate. 50.6 ml of water and 9.9 ml of neodymium nitrate are introduced into a second beaker.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring. The first solution of nitrates is introduced, over the course of 50 minutes, into the reactor stirred at a speed of 400 rpm, the second solution of nitrate is introduced over the course of 10 minutes and the stirring is fixed at 400 rpm.

The resulting precipitate suspension is placed in an autoclave and the process is then carried out (autoclaving, addition and amount of lauric acid, washing and calcination) as in example 1.

COMPARATIVE EXAMPLE 12

This example relates to the preparation of a composition containing zirconium oxide, cerium oxide, yttrium oxide and neodymium oxide in the following respective proportions as weight percentage of the oxides: 72%-10%-8%-10%, according to a process in which the compounds of rare earths other than cerium are introduced at different steps of the process, as in examples 1 to 8, but with the same stirring energy in each of these steps, contrary to these examples.

The solutions of zirconium nitrate, cerium nitrate, yttrium nitrate and neodymium nitrate used in this example have the same characteristics as those used in example 1.

Two solutions of nitrates are prepared beforehand, one consisting of cerium nitrate and zirconium nitrate and the other consisting of yttrium nitrate and neodymium nitrate. 0.377 l of water is introduced into a first beaker with 0.24 l of zirconium nitrate and also 0.039 l of cerium nitrate. 94.7 ml of water, 29.4 ml of yttrium nitrate and 19.8 ml of neodymium nitrate are introduced into a second beaker.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The two solutions previously prepared are kept constantly stirring.

The first solution of nitrates is introduced, over the course of 40 minutes, into the reactor stirred at a speed of 500 rpm, the second solution of nitrates is introduced over the course of 20 minutes and the stirring is fixed at 500 rpm.

The resulting precipitate suspension is placed in an autoclave and the process is then carried out (autoclaving, addition and amount of lauric acid, washing and calcination) as in example 1.

COMPARATIVE EXAMPLE 13

This example relates to the preparation of a composition identical to that in example 2, but according to a process in which the zirconium and cerium compounds and the compounds of the other rare earths are introduced in the same step.

The solutions of zirconium nitrate, cerium nitrate, lanthanum nitrate, yttrium nitrate and neodymium nitrate used in this example have the same characteristics as those used in example 1.

A solution of nitrates is prepared beforehand from 0.44 l of water, 0.27 l of zirconium nitrate, 0.039 l of cerium nitrate, 4.1 ml of lanthanum nitrate, 29.4 ml of yttrium nitrate and 9.9 ml of neodymium nitrate.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The solution of nitrates previously prepared is kept constantly stirring.

This solution is introduced, over the course of 60 minutes, into a reactor stirred at a speed of 450 rpm.

The resulting precipitate suspension is placed in an autoclave and the process is then carried out (autoclaving, addition and amount of lauric acid, washing and calcination) as in example 1.

COMPARATIVE EXAMPLE 14

This example relates to the preparation of a composition identical to that of example 3, but according to a process in which the zirconium and cerium compounds and the compounds of the other rare earths are introduced in the same step.

The solutions of zirconium nitrate, cerium nitrate, lanthanum nitrate, yttrium nitrate and neodymium nitrate used in this example have the same characteristics as those used in example 1.

A solution of nitrates is prepared from 0.458 l of water, 0.2 l of zirconium nitrate, 97.6 ml of cerium nitrate, 4.1 ml of lanthanum nitrate, 29.4 ml of yttrium nitrate and 9.9 ml of neodymium nitrate.

A solution of aqueous ammonia (12 mol/l) is introduced, with stirring, into a reactor equipped with an inclined-blade stirring rotor and the volume is then made up with distilled water so as to obtain a total volume of 0.8 liter and a stoichiometric excess of aqueous ammonia of 40% relative to the cations to be precipitated.

The solution previously prepared is kept constantly stirring.

The solution of nitrates is introduced, over the course of 60 minutes, into the reactor stirred at a speed of 400 rpm.

The resulting precipitate suspension is placed in a stainless steel autoclave equipped with a stirring rotor.

The temperature of the medium is brought to 150° C. for 1 hour with stirring.

The process is then carried out (addition and amount of lauric acid, washing and calcination) as in example 1.

Table 1 below gives, for the compositions of each of the previous examples, the specific surface areas after calcination for the times and at the temperatures indicated.

The calcinations at 900° C. and at the other temperatures up to 1200° C. were carried out on the products obtained at the end of the process described in the examples, i.e. products which have already undergone a first calcination at 700° C.

TABLE 1

| Example | Specific surface area (m²/g) | | | | | |
|---|---|---|---|---|---|---|
| | 4 h 700° C. | 4 h 900° C. | 4 h 1000° C. | 4 h 1100° C. | 10 h 1150° C. | 10 h 1200° C. |
| 1 | 75 | 64.6 | 48.3 | 27 | 11.8 | 2.6 |
| 2 | 77 | 69.3 | 49.2 | 26 | 7.1 | 2.1 |
| 3 | 71 | 68 | 52 | 27.4 | 13 | 4 |
| 4 | | 66 | 47.6 | 28.8 | 15.8 | 6.4 |
| 5 | | 56.7 | 37.5 | 24 | 15.5 | 9.7 |
| 6 | | | | 27 | 17 | |
| 7 | | | | 26 | 17.5 | |
| 8 | | 66.4 | 47.6 | 28.8 | 15.8 | 8.5 |
| 9 | 80 | 65 | 50 | 33 | 14 | 4 |
| 10 | 75 | 63 | 49 | 29 | 11 | 4 |
| Comparative 11 | 79 | 64 | 47 | 27 | 7.4 | |
| Comparative 12 | 70 | 64 | 49 | 27 | 7.2 | |
| Comparative 13 | 69 | 65 | 50 | 20.8 | 6.7 | 2.1 |
| Comparative 14 | 61 | 59 | 50 | 23.6 | 6.5 | 1.7 |

Table 2 below gives, for the compositions of each of the previous examples, the total pore volume and the pore size.

These porosity characteristics are those measured on compositions which were calcined at 900° C. for 4 hours.

The values which appear in the "pore size" column correspond to the diameters about which the pore populations are centered, the indication of a single value indicating the presence of a single population and the indication of two values indicating the presence of two populations.

TABLE 2

| Example | Total pore volume (ml Hg/g) | Pore size (nm) |
|---|---|---|
| 1 | 1.8 | 25-100 |
| 2 | 1.6 | 25-100 |
| 3 | 1.74 | 25-100 |
| 4 | 1.8 | 30-100 |
| 5 | 1.5 | 35-100 |
| 6 | 1.7 | 30-100 |
| 7 | 1.8 | 32-100 |
| 8 | 1.8 | 30-150 |
| 9 | 1.6 | 25-100 |
| 10 | 1.7 | 30-90 |

TABLE 2-continued

| Example | Total pore volume (ml Hg/g) | Pore size (nm) |
|---|---|---|
| Comparative 11 | 1.4 | 30 |
| Comparative 12 | 1.42 | 32 |
| Comparative 13 | 1.3 | 30 |
| Comparative 14 | 1.3 | 30 |

The appended FIG. 1 is a curve obtained from a pore size plot of the product in example 1 after calcination at 900° C.

This curve gives the derivative of the pore volume as a function of the pore diameter. The presence of a first peak centered around a pore diameter value of 25 nm and of a second peak centered around a pore diameter value of 100 nm can clearly be seen on this curve.

Crystallographic Structure

After calcination at 1000° C. for 4 hours, the compositions of examples 1, 2, 7 and 8 exhibit two distinct crystallographic phases of cubic nature and those of examples 3 to 6 and 9 to 14 a single phase.

EXAMPLE 15

This example illustrates the OSC properties of compositions according to the invention (compositions according to examples 1 and 3) and of comparative compositions (compositions according to comparative example 9 and according to comparative example 12).

Sample Preparation

A dry impregnation of samples of compositions as obtained at the end of the process described in the examples mentioned in the previous paragraph is first of all carried out using a solution of rhodium nitrate under conditions such that the compositions have, after impregnation, a rhodium content of 0.1% (weight content of Rh metal).

The impregnated compositions are then calcined at 500° C. for 4 hours under air. They then undergo an aging treatment at 1100° C. for 6 hours in an atmosphere with a composition of 2% CO, 10% $H_2O$ and the rest being nitrogen, then with a composition of 2% $O_2$, 10% $H_2O$ and the rest being nitrogen, the change in atmosphere taking place every 5 minutes.

Measurement of OSC 30 mg of product are placed in a reactor, the temperature of which is regulated at 350° C. Predetermined amounts of CO (5% in helium) and of $O_2$ (2.5% in helium) are alternately injected into this reactor, at a frequency of 1 Hz (one injection for one second) and at a flow rate of 200 cm³/minute. The CO and $O_2$ contents are analyzed at the outlet of the reactor using a mass spectrometer.

The OSC is expressed in ml of $O_2$ per gram and per second using the formula:

$$OSC\ (ml.g^{-1}.s^{-1}) = [\Delta(CO) \times dCO]/(2 \times P)$$

in which $\Delta(CO)$ represents the amount of CO converted at each second, deco the flow rate of CO and P the weight of the sample.

Table 3 below gives the results obtained.

TABLE 3

| Composition | OSC (ml $O_2$/g) |
|---|---|
| Example 1 | 1.2 |
| Comparative example 9 | 1 |
| Example 3 | 1.75 |
| Comparative example 12 | 1.5 |

It is clearly seen that, for products of identical compositions (examples 1 and 9 and examples 3 and 12, respectively), the products according to the invention show improved OSC.

The invention claimed is:

1. A composition comprising zirconium oxide, cerium oxide and yttrium oxide or comprising zirconium oxide, cerium oxide and at least two oxides of two rare earths other than cerium, in a weight proportion of zirconium oxide of at least 20% and of cerium oxide of at most 70%, wherein after calcination at a temperature of 900° C. for 4 hours, two populations of pores of which the respective diameters are centered, for the first population, about a value of 20 nm to 40 nm and, for the second population, about a value of 80 nm to 200 nm.

2. The composition as defined by claim 1, wherein the diameter of the first population of pores is centered about a value of 20 nm to 35 nm and the diameter of the second population of pores is centered about a value of 80 nm to 150 nm.

3. The composition as defined by claim 1, wherein after calcination at a temperature of 900° C. for 4 hours, it has a total pore volume of at least 1.5 ml Hg/g.

4. The composition as defined by claim 1, wherein the composition comprises at least two oxides of two rare earths other than cerium and in which one of these rare earths is lanthanum, in that it has a zirconium oxide content of at least 60% and in that, after calcination at 1000° C. for 4 hours, it is in the form of two different crystallographic phases, at least one of which is cubic in nature.

5. The composition as defined by claim 1, wherein after calcination at 1100° C. for 4 hours, it exhibits a population of pores of which the diameter is centered about a value of 30 nm to 70 nm.

6. The composition as defined by claim 4, wherein after calcination at 1100° C. for 4 hours, it has a total pore volume of at least 0.9 ml Hg/g.

7. The composition as defined by claim 4, wherein the composition has a cerium oxide content of from 5% to 45%.

8. The composition as defined by claim 4, wherein the composition has a content of oxides of rare earths other than cerium of from 10% to 30%.

9. The composition as defined by claim 4, wherein the composition has a zirconium oxide content of at least 45% and, after calcination at 1100° C. for 4 hours, a specific surface area of at least 25 m²/g.

10. The composition as defined by claim 4, wherein after calcination at 1150° C. for 10 hours, it has a specific surface area of at least 7 m²/g.

11. A process for preparing a composition as defined by claim 1, wherein the process comprises the following steps:
    a1. forming a mixture comprising either zirconium and cerium compounds only or these compounds with one or more compounds of rare earths other than cerium, in an amount of the latter compounds which is less than the amount required to obtain the desired composition;
    b1. bringing said mixture together with a basic compound, with stirring;
    c1. bringing the medium obtained in the preceding step together, with stirring, with either the compound(s) of rare earths other than cerium if this or these compound(s) was (were) not present in step (a1), or the required remaining amount of said compound(s), the stirring energy used during step (c1) being less than that used during step (b1), as a result of which a precipitate is obtained;
    d1. heating said precipitate in an aqueous medium;
    e1. adding an additive selected from the group consisting of an anionic surfactant, a nonionic surfactant, a polyethylene glycol, a carboxylic acid and a salt thereof and a carboxymethylated fatty alcohol ethoxylate surfactant to the precipitate obtained in the preceding step; and
    f1. calcining the resulting precipitate.

12. A process for preparing a composition as defined by claim 1, wherein the process comprises the following steps:
    a2. bringing together zirconium and cerium compounds, in liquid phase, with a basic compound, as a result of which a precipitate is formed;
    b2. heating said precipitate in an aqueous medium;
    c2. adding an additive selected from the group consisting of an anionic surfactant, a nonionic surfactant, a polyethylene glycol, a carboxylic acid and a salt thereof and a carboxymethylated fatty alcohol ethoxylate surfactant to the precipitate obtained in the preceding step;
    d2. calcining the precipitate resulting from the preceding step at a temperature of at most 500° C.;
    e2. forming a liquid-phase mixture comprising the product resulting from the preceding step and one or more compounds of rare earths other than cerium;
    f2. bringing this mixture together with a basic compound;
    g2. heating the solid product resulting from the preceding step in an aqueous medium; and
    h2. calcining the product obtained at the end of the preceding step.

13. A process for preparing a composition as defined by claim 1, wherein the process comprises the following steps:
    a3. bringing together either zirconium and cerium compounds only, or these compounds with one or more compounds of rare earths other than cerium in an amount of the latter compound(s) which is less than the amount required to obtain the desired composition, in liquid phase, with a basic compound, as a result of which a precipitate is formed;
    b3. heating said precipitate in an aqueous medium;
    c3. bringing together the medium obtained in the preceding step with either one or more compounds of rare earths other than cerium, if these compounds were not present in step (a3), or a required remaining amount of said compounds;
    d3. bringing together the medium obtained in the preceding step with a basic compound;
    e3. adding an additive selected from the group consisting of an anionic surfactant, a nonionic surfactant, a polyethylene glycol, a carboxylic acid and a salt thereof and a carboxymethylated fatty alcohol ethoxylate surfactant to the precipitate obtained in the preceding step; and
    f3. calcining the resulting precipitate.

14. The process as defined by claim 11, wherein a compound selected from the group consisting of a nitrate, a sulfate, an acetate, a chloride and a ceric ammonium nitrate is used as a zirconium compound, a cerium compound and a compound of the other rare earth.

15. The process as defined by claim 11, wherein the heating of the precipitate in steps (d1), (b2), (g2) and (b3) is carried out at a temperature of at least 100° C.

16. A catalytic system, which comprises a composition as defined by claim 1.

17. A method for processing an exhaust gas from an internal combustion engine, the method comprising processing the exhaust gas with a catalyst of a catalytic system as defined by claim 16.

18. The composition as defined by claim 1, wherein the diameter of the first population of pores is centered about a value of 20 nm to 30 nm.

19. The composition as defined by claim 1, wherein the diameter of the second population of pores is centered about a value of 90 nm to 110 nm.

20. The composition as defined by claim 1, wherein after calcination at a temperature of 900° C. for 4 hours, the total pore volume is at least 1.7 ml Hg/g.

21. The composition as defined by claim 4, wherein after calcination at 1150° C. for 10 hours, it has a specific surface area of of at least 10 m$^2$/g.

22. The method for processing the exhaust gases from internal combustion engines of a catalytic system as defined by the composition of claim 1.

\* \* \* \* \*